United States Patent [19]
Kanoh et al.

[11] Patent Number: 5,873,077
[45] Date of Patent: *Feb. 16, 1999

[54] METHOD AND APPARATUS FOR SEARCHING FOR AND RETRIEVING DOCUMENTS USING A FACSIMILE MACHINE

[75] Inventors: Toshio Kanoh; Gregory J. Wolff, both of Mountain View, Calif.

[73] Assignees: Ricoh Corporation, Menlo Park, Calif.; Ricoh Company, Ltd., Tokyo, Japan

[ * ] Notice: The term of this patent shall not extend beyond the expiration date of Pat. No. 5,858,413.

[21] Appl. No.: 632,681

[22] Filed: Apr. 16, 1996

Related U.S. Application Data

[63] Continuation-in-part of Ser. No. 372,784, Jan. 13, 1995.

[51] Int. Cl.$^6$ .................................................. G06F 17/30
[52] U.S. Cl. ........................... 707/3; 707/5; 382/306; 370/352; 379/100.11
[58] Field of Search ........................... 395/603, 615, 395/201, 605; 358/403; 382/306; 707/5, 3, 104; 370/352; 379/100.11

[56] References Cited

U.S. PATENT DOCUMENTS

| | | | |
|---|---|---|---|
| 4,013,827 | 3/1977 | Starck et al. | 358/409 |
| 4,553,206 | 11/1985 | Smutek et al. | 707/101 |
| 4,553,261 | 11/1985 | Froessl | 382/306 |
| 4,574,395 | 3/1986 | Kato | 382/306 |
| 4,760,606 | 7/1988 | Lesnick et al. | 382/306 |
| 5,068,888 | 11/1991 | Scherk et al. | 379/100.11 |
| 5,093,873 | 3/1992 | Takahashi | 382/306 |
| 5,099,340 | 3/1992 | Kamada et al. | 358/403 |
| 5,115,326 | 5/1992 | Burgess et al. | 358/440 |
| 5,129,016 | 7/1992 | Murankami et al. | 382/306 |
| 5,170,266 | 12/1992 | Marsh et al. | 358/468 |
| 5,175,684 | 12/1992 | Chong | 395/793 |
| 5,237,430 | 8/1993 | Sakurai | 358/444 |
| 5,241,466 | 8/1993 | Perry | 395/201 |
| 5,301,315 | 4/1994 | Pellicano | 707/4 |
| 5,337,362 | 8/1994 | Gormish et al. | 380/54 |
| 5,339,412 | 8/1994 | Fueki | 395/615 |
| 5,341,222 | 8/1994 | Newman et al. | 358/403 |
| 5,436,960 | 7/1995 | Campana, Jr. et al. | 455/512 |
| 5,461,488 | 10/1995 | Witek | 358/402 |
| 5,497,319 | 3/1996 | Chong et al. | 395/752 |
| 5,530,852 | 6/1996 | Meske, Jr. et al. | 395/200.36 |
| 5,548,666 | 8/1996 | Yoneda et al. | 382/276 |
| 5,563,955 | 10/1996 | Bass et al. | 382/101 |
| 5,576,954 | 11/1996 | Driscoll | 395/603 |
| 5,579,407 | 11/1996 | Murez | 382/164 |
| 5,608,786 | 3/1997 | Gordon | 370/352 |

*Primary Examiner*—Paul R. Lintz
*Attorney, Agent, or Firm*—Blakely Sokoloff Taylor & Zafman, LLP

[57] ABSTRACT

While Web servers and clients, such as Mosiac, have opened the door to on-line publishers and consumers of information, these services have only been available to those having an Internet connection. In other words, individuals that do not have a direct Internet connection, including a computer and a data channel to the Internet, cannot search for documents and other resources available through the Web. The present invention obtains documents by receiving a facsimile transmission of a document with at least one search term and performing a search based on search terms on the received document.

59 Claims, 12 Drawing Sheets

SEARCH FORM

Fill in boxes, circle desired databases and fax to ####
Search for documents including terms:

▭ and ▭ } 301

▭ or ▭ } 302 in databases:

big.web.pages whats.new.pages } 303 company.pages
. . . . .

FIG. 3

Circle desired links and Fax to

Search Results
Found 4 matches containing ricoh. Displaying matches 1-4.

Matching Sites

Business and Economy:Companies:Photography:Supplies and Equipment:Repair

- United Camera & Binocular Repair Corp - Photographic repair service for cameras, projectors, video cameras, vcrs, lenses, audio visual EQ, carousels for Kodak, Canon Fuji, Pentax, Minolta, Ricoh, Olympus, and all others.

Business and Economy:Companies:Research

- RICOH California Research Center Home Page - Basic science through applied research to advanced prototyping.

Regional:U.S. States:California:Cities:Santa Cruz:Business

- Camera Club - New and used cameras Nikon Canon Minolta Olympus Pentax Yashica Ricoh Tamron Sigma Hasselblad Mamiya Bronica Rolleiflex Regional:U.S. States:Minnesota:Business

- Metro Sales-Retailers and servicers of Ricoh copiers.

FIG. 5

METHOD AND APPARATUS FOR SEARCHING FOR AND RETRIEVING DOCUMENTS USING A FACSIMILE MACHINE

This application is a continuation-in-part of U.S. patent application Ser. No. 08/372,784, entitled "Accessing and Publishing Electronic Document Images Having Embedded Links to Other Electronic Document Images, filed Jan. 13, 1995.

FIELD OF THE INVENTION

The present invention relates to the field of document retrieval systems; more particularly, the present invention relates to searching for documents on an interconnected computer network, such as the World Wide Web, or other similar document resource supply, using a facsimile (fax) machine.

BACKGROUND OF THE INVENTION

An important use of computers is the transfer of information over a network. Currently, the largest computer network in existence is the Internet. The Internet is a worldwide interconnection of computer networks that communicate using a common protocol. Millions of computers, from low end personal computers to high-end super computers are coupled to the Internet.

The Internet grew out of work funded in the 1960s by the U.S. Defense Department's Advanced Research Projects Agency. For a long time, Internet was used by researchers in universities and national laboratories to share information. As the existence of the Internet became more widely known, many users outside of the academic/research community (e.g., employees of large corporations) started to use Internet to carry electronic mail.

In 1989, a new type of information system known as the World-Wide Web ("the Web") was introduced to the Internet. Early development of the Web took place at CERN, the European Particle Physics Laboratory. The Web is a wide-area hypermedia information retrieval system aimed to give wide access to a large universe of documents. At this time, the Web was known to and used by the academic/research community only. There was no easily available tool which allows a technically untrained person to access the Web.

In 1993, researchers at the National Center for Supercomputing Applications (NSCA) released a Web browser called "Mosiac" that implemented a graphical user interface (GUI). Mosiac's graphical user interface was simple to learn yet powerful. The Mosiac browser allows a user to retrieve documents from the Web using simple point-and-click commands.

The architecture of the Web follows a conventional client-server model. The terms "client" and "server" are used to refer to a computer's general role as a requester of data (the client) or provider of data (the server). In the Web environment, Web browsers are clients and Web documents reside on servers. Web clients and Web servers communicate using a protocol called "Hypertext Transfer Protocol" (HTTP). A browser opens a connection to a server and initiates a request for a document. The server delivers the requested document, typically in the form of a text document coded in a standard Hypertext Markup Language (HTML) format. The server serves a passive role. It accepts commands from the client and sends data to the client, but cannot request the client to perform any action.

Portions of documents displayed on the Web contain hypertext links. The hypertext links link graphics or text on one document with another document on the Web. Each hypertext link is associated with a Universal Resource Locator (URL). A URL specifies a server and a particular document on that server. When a user selects a hypertext link, using, for instance, a cursor, the graphical browser connects to the server and retrieves the document(s) specified by the URL(s).

Some servers provide a means for searching a collection of documents. Upon initial request, the server supplies a form to the browser. The user, using the graphical browser, enters data such as keywords on this form as part of a search query and then opens a new connection to the server and submits this data to the server. The server responds to this request with a new document listing some or all of the documents matching those key words or other data requested by the browser. Each document listed normally includes a hypertext link to the actual document so that the user may easily retrieve that document (as they would any other link).

While Web servers and clients, such as Mosaic, have opened the door to on-line publishers and consumers of information, these services have only been available to those having an Internet connection. In other words, individuals that do not have a direct Internet connection, including a computer and a data channel to the Internet, cannot search for documents and other resources available through the Web. It is desirable to allow searching for documents on the Web (or other such network) to individuals that do not have such a direct connection.

The present invention provides access to the Web to individuals that do not have a computer or connection to the Internet or other network/resource supply. The present invention allows individuals to search for (and retrieve) documents on the Web as if actually connected to the Web individually. In this manner, the present invention allows an individual to have client capabilities when that individual does not have a direct connection to a network.

SUMMARY OF THE INVENTION

The present invention provides a method and apparatus for obtaining documents. The present invention comprises a method and apparatus receiving a facsimile transmission of a document with at least one search term. The present invention also provides a method and apparatus for performing a search based on search terms on the received document.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 is an exemplary search form according to the present invention.

FIG. 5 illustrates an example of a hard copy document with machine readable information according to the present invention.

DETAILED DESCRIPTION OF THE PRESENT INVENTION

Figure 1:
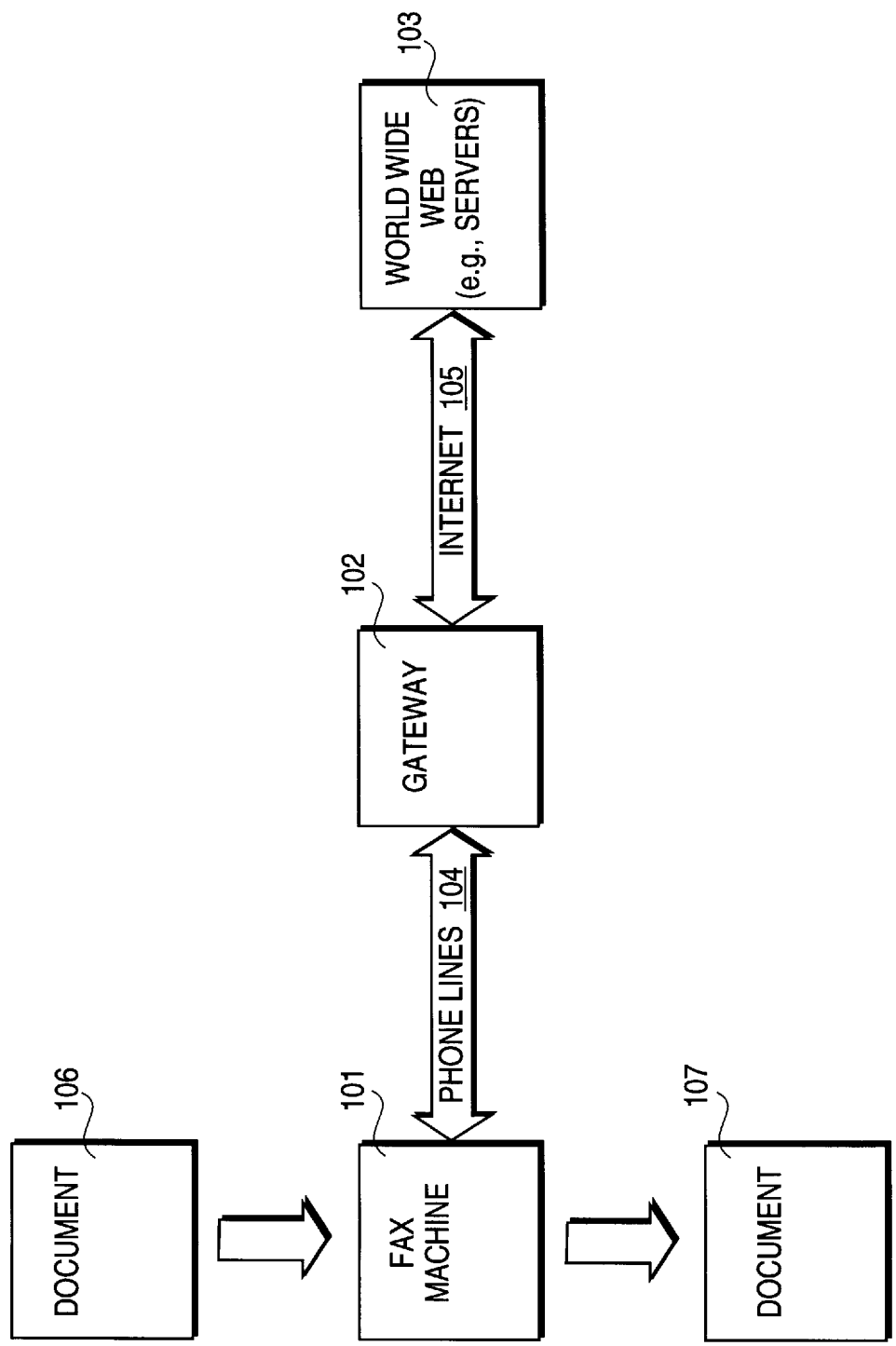
FIG. 1 is a block diagram of one embodiment of the document search and retrieval system of the present invention.

A method and apparatus for searching for and retrieving documents is described. In the following detailed description of the present invention numerous specific details are set forth, such as resource and document identifier types, document types, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the Present Invention

The present invention provides access to documents by searching for and retrieving documents using a facsimile machine. In the present invention, a document may be any type of media such as, but not limited to, text, images, sound, etc.

In the present invention, in order to search for documents on the Web using only a facsimile (fax) machine, a user merely fills out a search form by writing or printing desired search terms or other well-known search parameters into one or more entry boxes on a document (e.g., page) and sends this document by facsimile to a server. The server extracts the search terms and performs a search using the search terms. In one embodiment, the server extracts the search terms from the document in an unrecognizable format (e.g., bitmaps) and sends these extractions to a character recognition engine (e.g., optical character recognition). The output of the character recognition engine is used in a query to a Web search engine, such as Yahoo, manufactured by Yahoo! Corporation of Sunnyvale, California, which performs a search in a manner well-known in the art. The results of the search are returned to the user via the fax machine. These results may include documents that satisfy the search or may include a listing of such documents. Using the present invention, the user may also select documents from the search results to be retrieved from the Web using the fax machine.

Thus, the present invention allows a fax machine to act as a Web client and retrieve text and images from any Web site. In this manner, the user can view multiple pages from the Web, even without a dedicated connection.

Overview of Client-Server Operation

The following is a brief explanation regarding client-server operation, URL's and browsing of the Web.

Conceptually, a computer network, such as the Internet, includes small computers and large computers, commonly used as servers. In general, small computers are "personal computers" or workstations and are the sites at which a human user operates the computer to make requests for data from other computers or servers on the network.

Usually, the requested data resides in large computers. In this scenario, small computers are clients and the large computers are servers. In this specification, the terms "client" and "server" are used to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client or server, or vice versa.

The World Wide Web ("Web") uses the client-server model to communicate information between clients and servers. Web servers are coupled to the Internet and respond to document requests from Web clients. Web clients (e.g., Web "browsers") are programs that allow a user to simply access Web documents located on Web servers.

An example of a client-server system interconnected through the Internet may include a remote server system interconnected through the Internet to a client system. The client system may include conventional components such as a processor, a memory (e.g., RAM), a bus which coupled the processor and memory, a mass storage device (e.g., a magnetic hard disk or an optical storage disk) coupled to the processor and memory through an I/O controller and a network interface, such as a conventional modem. The server system also may include conventional components such as a processor, memory (e.g., RAM), a bus which coupled the processor and memory, a mass storage device (e.g., a magnetic or optical disk) coupled to the processor and memory through an I/O controller and a network interface, such as a conventional modem. It will be appreciated from the description below that the present invention may be implemented in software which is stored as executable instructions on a computer readable medium on the client and server systems, such as mass storage devices respectively, or in memories respectively.

To define the addresses of resources on the Internet, Uniform Resource Locator (URL) system are used. A URL is a descriptor that specifically defines a type of Internet resource and its location. URLs have the following format:

protocol://domain.address/path_name

Where "protocol" defines the protocol of communication between the server and client. Web documents are often accessed via the "http" protocol (hypertext transfer protocol). Other protocols include "ftp" (file transmission protocol), gopher, "telnet". The "domain.address" defines the domain name address of the computer server that the resource is located on. Finally, the "path_name" defines a directory path within the file system of the server that identifies the resource or more generally an indentifier or request. The right most name on the path name portion is usually the name of an actual file, but can also contain key value pairs which are used by the server to generate documents on the fly. By convention, many Web pages end with the suffix ".html" indicating that the file is a HyperText Markup Language document.

An example of a URL for a Web document is:

http://info.tech.ch/hypertext/Data/WWW/History.html

This URL indicates that by using the HTTP (Web) protocol to reach a server called "info.tech.ch", there is a directory "hypertext/Data/WWW" that contains a hypertext document named "History.html." Resources on the Internet are addressable by their URL.

To access an initial Web document, the user enters the URL for a Web document into a Web browser program. The Web browser then sends an http request to the server that has the Web document using the URL. The Web server responds to the http request by sending the requested HTTP object to the client. In most cases, the HTTP object is a plain text (ASCII) document containing text (in ASCII) that is written in HyperText Markup Language (HTML). The HTML document usually contains hyperlinks to other Web documents. The Web browser displays the HTML document on the screen for the user and the hyperlinks to other Web documents are emphasized in some fashion such that the user can identify and select the hyperlinks.

Using a Fax Machine as a Web Client

FIG. 1 illustrates one embodiment of the present invention. FIG. 1 is a block diagram of one embodiment of the system of the present invention. Referring to FIG. 1, a fax machine 101 is coupled to gateway 102 via phone lines 104. Gateway 102 is also coupled to Internet 105, or other network or document resource, which provides access to the Web 103.

In one embodiment, fax machine 101 operates as a typical fax machine in the prior art. That is, fax machine 101 is capable of sending and receiving facsimile transmissions using phone lines 104. Also, fax machine 101 includes a scanning mechanism to scan documents, such as, for example, document 106, which thereafter may be transmitted over phone lines 104. Fax machine 101 also includes a print engine to produce hard copy representations of received facsimile transmissions, such as document 107.

In the present invention, gateway 102 interfaces fax machine 101 to the Web 103 (via the Internet 105). In one embodiment, gateway 102 comprises a computer system, or workstation, that is coupled to phone lines 104 via fax modems, which are well-known in the art. The functionality and an exemplary implementation of gateway 102 will be described below. Gateway 102 is not limited to interfacing with only one fax machine (102) and may support any number of fax machines. However, gateway 102 may be limited by the number of document retrieval requests or publication requests that can be supported at any one time.

The Web 103 includes multiple servers and machines interconnected to gateway 102 via Internet 105. With respect to the Web 103, it should be noted that the present invention is not limited to searching for and retrieving documents on the "World Wide Web" or the "Internet." The teachings of the present invention may be applied to various networks, data and document storage and archival facilities, or other types of client/server systems which have documents or other information available upon request.

The system of the present invention does not require a fax machine as long as the system includes components and devices that can provide functionality provided by the fax machine. These functions include, but are not limited to, being able to exchange documents, i.e. by receiving one version of a document and sending another version, and being able to view a document by creating a bitmap or other display of the document.

Document Searching

The present invention provides for searching for documents on the Web via a fax machine. In the present invention, gateway 102 acts as a server.

Figure 2:
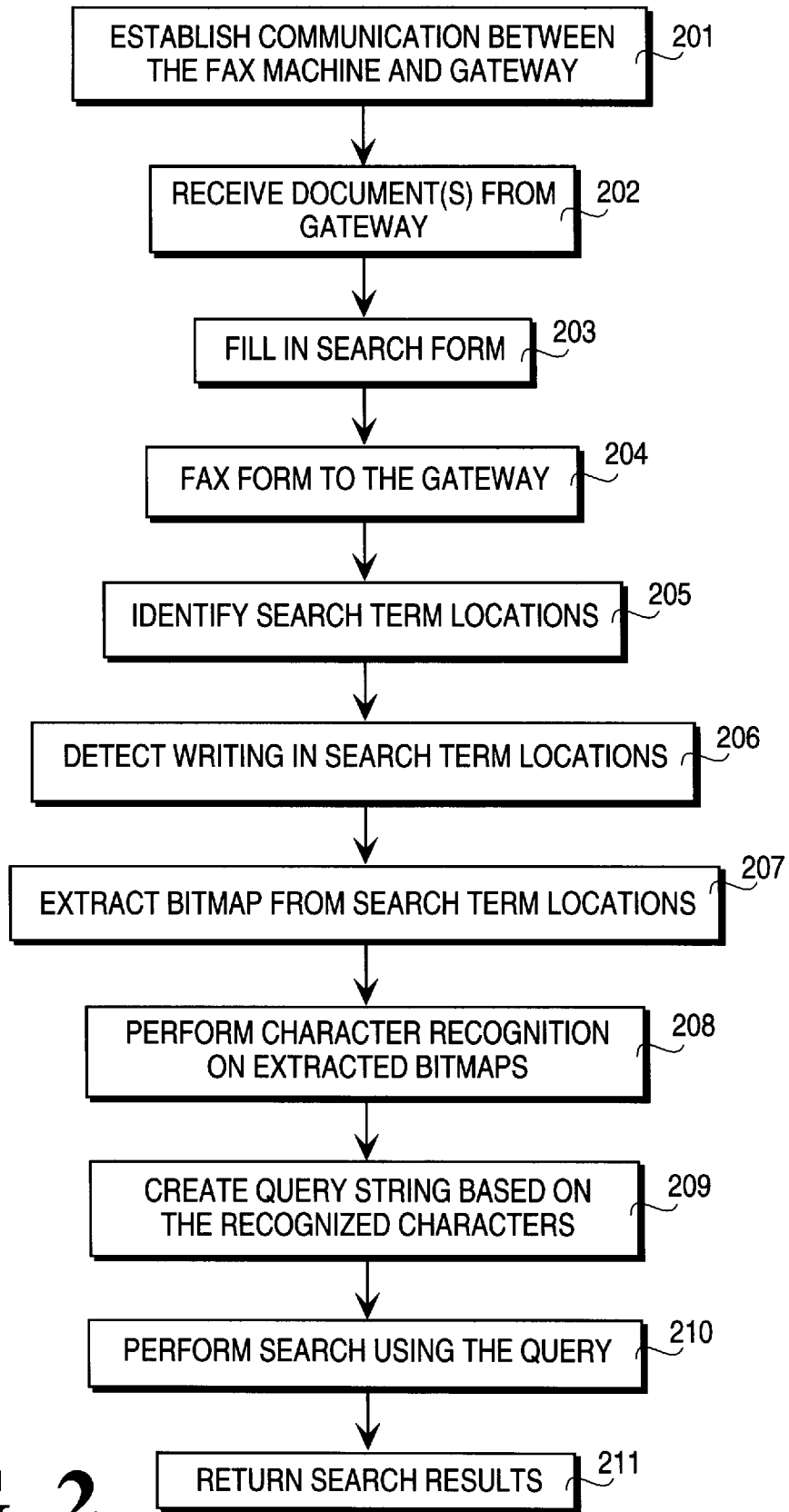
FIG. 2A is a flow chart of the search process of the present invention.
FIG. 2B is a flow diagram of the search process of the present invention.
FIG. 2C illustrates client-server communication.
FIG. 2D is a block diagram of one embodiment of the gateway of the present invention.

FIG. 2A is a flow diagram illustrating the process of document retrieval performed by the user of fax machine 101 according to the present invention. Referring to FIG. 2A, the user begins the process by initiating communication between fax machine 101 and gateway 102 (processing block 201). In one embodiment, the user establishes communication with gateway 102 by sending a facsimile transmission of a specific document (e.g., document 106) to gateway 102. In one embodiment, this document 106 is a blank page. In another embodiment, the document 106 may include information to enable gateway 102 to identify the document.

As a result of establishing communication with gateway 102, the user receives a document, such as document 107, from gateway 102 that is output from fax machine 101 in hard copy form (processing block 202). The first document received by the user from gateway 102 is referred to herein as the home page. The document may have multiple pages.

Other methods of establishing communication to receive the document may be used. For instance, an individual may verbally or otherwise notify an operator of gateway 102 to request the document be sent to the user of fax machine 101. The document may be sent automatically or otherwise by, for instance, another user of the Web. Similarly, an automatic service (e.g., daily electronic newspaper) may notify the user when a particular page changes. Note also that the user may have received the document by other means, such as by mail, air service, and/or delivery or been given the document by another.

At least one page (or portion) of the document received from gateway 102 is a search form which is filled in by a user to specify a search. In one embodiment, the search form contains one or more boxes or other specified locations in which search terms may be written. In one embodiment, the search form is a page that includes several boxes. Each of the several boxes may be associated with a different type of query or search. An example of such a page is shown in FIG. 3. Referring to FIG. 3, the search form includes two sets of boxes, one set 301 for a search in which both terms (one in each box) must be in a document located, and the other set 302 for a search in which either search term may be in a document, for the document to satisfy the search. The search form also includes a listing of databases 303 in which the search is to take place. In one embodiment, any number of databases may be selected for the search. Note that, in one embodiment, such a database listing is not used and all databases, or a predetermined number of databases (as preselected by the gateway) are searched. Selection of a database may be made by marking (e.g., circling, lining or crossing out, placing a check or other distinctive mark near or on) the database to be searched. Selection may be performed by marking the barcode below each database, which identifies it, instead of the database name. In an alternate embodiment, one or more boxes or other locations may be available to a user to enter specific databases in the same manner as search terms are entered.

Each of the boxes and each element in the list of databases includes a barcode as an identifiable pattern for locating information on the search form when performing recognition, as is discussed below.

Note that the use of boxes or other prespecified locations for search terms merely faciliatates recognition performed later. In an alternative embodiment, search terms may be placed at any location on a page(s) and the present invention obtains the search terms by, for instance, looking for keywords or predetermined recognizable patterns (e.g., underlines, barcodes, etc.).

Referring back to FIG. 2A, the user fills in the search form (processing block 203). As discussed above, in one embodiment, the search terms are entered on the form by writing or printing them, while databases are circled.

Once the search terms have been written or printed onto the form, the filled out form takes the role of document 106 and is faxed to the gateway 102 (processing block 204). Gateway 102, acting as a server, identifies the search term locations (e.g., the box and database locations) (processing block 205). In one embodiment, a detector in gateway 102 identifies the box locations by locating the barcodes on document 106. Note that gateway 102 may automatically search all documents it receives for search term locations, regardless of whether such documents are search forms. Only if the search term locations are found is any subsequent search performed.

After identifying box locations, the present invention detects the writing in the boxes (processing block 206). In one embodiment, the present invention detects the writing by examining the spatial intensity variance. Boxes with writing in them will have a high mean and high degree of variance between the pixel values within the box. Boxes with no writing will have very low variances and a low mean value. The mean and variance for all of the pixels in the box may be computed according to the following equations:

$$\text{Mean} = \frac{\sum_{j=1}^{N} P_j}{N}$$

$$\text{Variance} = \frac{\sum_{j=1}^{N} (P_j - \text{Mean})^2}{N}$$

$P$ = Pixel intensity value $N$ = number of pixels $j$ varies over all the pixels In an alternate embodiment, the present invention detects the writing by examining a predefined set of features. Various "interest" operators (e.g., morphological operators) could be used. The simplest would look for connected components (e.g., neighboring pixels with "on" values). Boxes with writing in them will have many connected components with a relatively larger number of pixels in each component. Boxes without writing will have few connected components (e.g., most pixels are "off") and those components will have very few pixels (pixels "on" due to noise are not likely to have "on" neighbors).

For each box in which writing is detected, gateway 102 of the present invention extracts bitmaps from those boxes (processing block 207) and passes a bitmap version of the contents of the boxes to an optical character recognition engine, which performs recognition on the bitmaps (processing block 208). In one embodiment, the recognition engine comprises a handwriting character recognition (HCR) engine.

In one embodiment, the databases selected by marking the search form may be identified by gateway 102, as described later, by the same manner in which specific documents are selected from the search results in the present invention. In one embodiment, these marked regions on the search form are extracted, the information (e.g., barcodes) obtained is decoded and the database is identified using the decoded information. In one embodiment, the extraction process is the same used by the present invention when identifying documents selected from the search result. This process is described below.

Next, gateway 102 of the present invention creates a query string using the recognized words and/or characters (processing block 209). In one embodiment, the query created by the present invention comprises a http query (e.g., a URL) like those generated by screen-based browsers.

An example URL is as follows:

http://www.yahoo.com/bin/search?p=keyword where the "keyword" is extracted by the recognition engine. If there were multiple keywords, then "p=keyword" portions would be included in the URL separated by an identifier of one or more characters (e.g., the character "?").

Next, a search is performed (processing block 210). Acting as client on the Web, gateway 102 uses the URL to contact other servers on the Web and requests documents corresponding to the query URL. Server 103 processes the query (well known in the art) and returns to gateway 102 URLs and other information corresponding to matching documents. This other information may include title, abstracts, document length, format, company information, author biographical information, related site information, etc.. Note that the present invention may be used with other pointers and document identifiers besides URLs.

In one embodiment, gateway 102 creates and renders a document containing the search results (with special barcodes for links) and sends the rendered document back to fax machine 101 via fax modem (processing block 211). In another embodiment, gateway 102 retrieves several or all of the matching documents (using the URLs), renders these documents and returns them to fax machine 101.

Additional processing may be used to limit the number of documents returned, to order the documents by relevance, or to group all documents from one site together. Results may be filtered based on history, similarity, etc. For example, gateway 102 may keep a list or database of documents which have been sent to a particular fax number, and not resend to the fax number any matching documents from the current query, thereby saving the time and materials (paper, toner, etc.) that would be incurred in sending a document that the user has already received. Such a list or database may be maintained on or by gateway 102. Likewise, if the search results contain several documents from the same site, gateway 102 may send only one of those documents (e.g., the most general or one with the shortest path). Of course, there are many other features and filtering mechanisms to filter the result before returning the document(s) via fax.

The search results may include a document with additional search boxes for refining or modifying the query. Gateway 102 can also add or modify terms in the user's original query. For example, if "thinking" was recognized as a keyword, the gateway might use both "think" and "thinking" as search terms (or any and all derivatives of a word).

Also, if the search fails (returns no documents, too few documents, or too many documents), gateway 102 could modify the search by adding or deleting keywords (or other criteria) and resubmit the query. For instance, if too few or no documents are returned, then a search request requiring two or more terms could be modified to require only one or some subset of the two or more terms (e.g., change "AND" operators in the search query to "OR" operators). Similarly, if a search produced too many documents, the search query could be modified by requiring multiple search terms to be in each document instead of allowing documents with only some subset of those terms (e.g., changing any "OR" operators to "AND" operators).

Gateway 102 can send the user, via fax machine 101, a list of updated or modified searches from which the user may select. In one embodiment, the list is similar to the listing of databases in FIG. 3 and a particular search or searches may be selected in the same manner as those databases are selected, such as by marking (circling) a machine readable code (e.g., barcode) or writing a number or letter associated with a particular search at some location of the page with the listing. Space may be included for the user to supply their own modified search. Note also that the list of potential searches could indicate the number of documents that satisfy each of the searches. This may help the user in deciding which search to select.

Note that the user could always add terms to the original form and resubmit it.

Figure 2B:
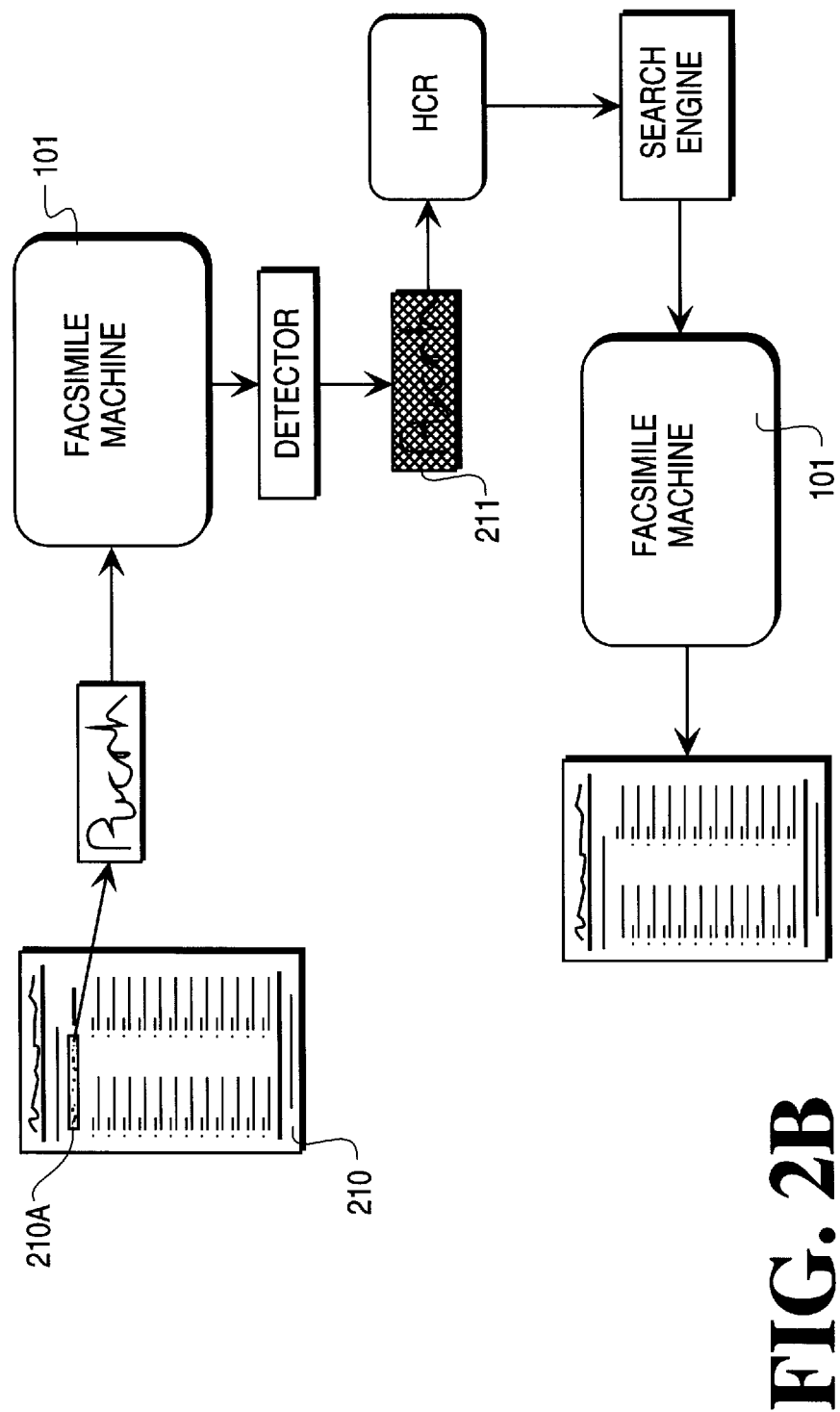

FIG. 2B illustrates the searching process. Referring to FIG. 2B, a search form 210 has a search term "Ricoh" written in box 210A. The search form 210 is inputted to fax machine 201 and sent to gateway 102. Detector 214 identifies the writing "Ricoh" and sends bitmaps of the writing to HCR engine 212. The results generated by HCR engine 212 are used by the search engine 213, which performs a search. The search results are then returned to the user via fax machine 101.

In one embodiment, gateway 102, acting as a web client, sends the search query to one or more servers. Gateway 102 may provide search terms to the server(s) in a variety of ways. For instance, gateway 102 may perform a "get" method in which the search terms are encoded in the URL and their presence is highlighted by one or more added set-off characters (e.g., the character "?"). The server receives the URL and parses it to locate the search terms (via the added set-off characters). Once the search terms have been decoded from the URL, the server creates a query from the search terms and performs the search in a manner well-known in the art. In another embodiment, gateway 102 sends a URL to one or more servers to initiate a connection and cause the server(s) to enter a mode in which it is waiting for search terms. Once the connection is in place, gateway 102 provides the search terms to the server(s). A server receives the search terms, automatically creates a search query, and performs the search. This is referred to as "post" operation.

In another embodiment, the search engine 213 comprises a program running on gateway 102 that searches a database (from the given sites) for the extracted keywords. The database is typically local to gateway 102, but this is not a requirement. Gateway 102 need only have some means of accessing the database(s) or information about its contents.

Figure 2C:
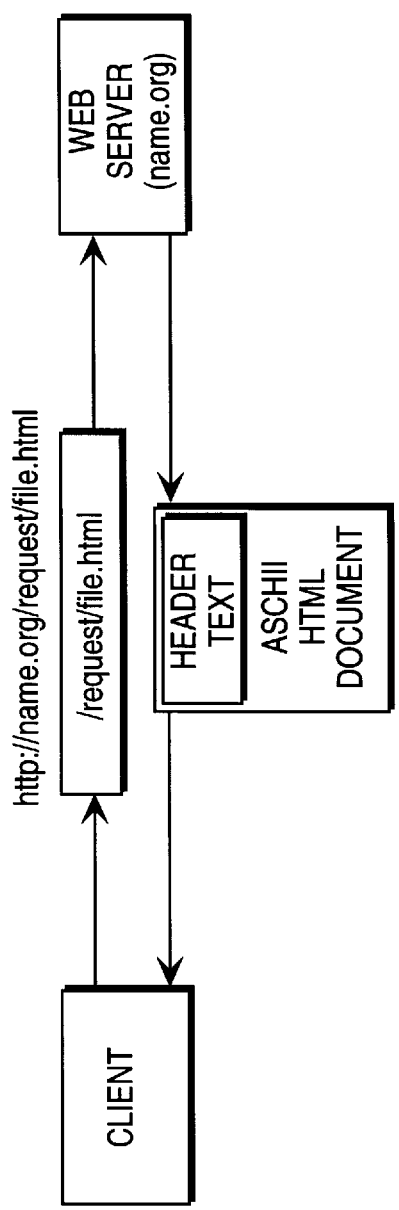

FIG. 2C illustrates client-server communication in general. Such communication occurs between gateway and multiple servers in the Web.

Referring to FIG. 2C, the client 401 of the present invention forwards a request (/request/file.html) to Web server 402, which is known by the domain name "name.org". Web server 402 sends the document to client 401. The document sent includes header text and an html document formatted in ASCII.

Figure 2D:
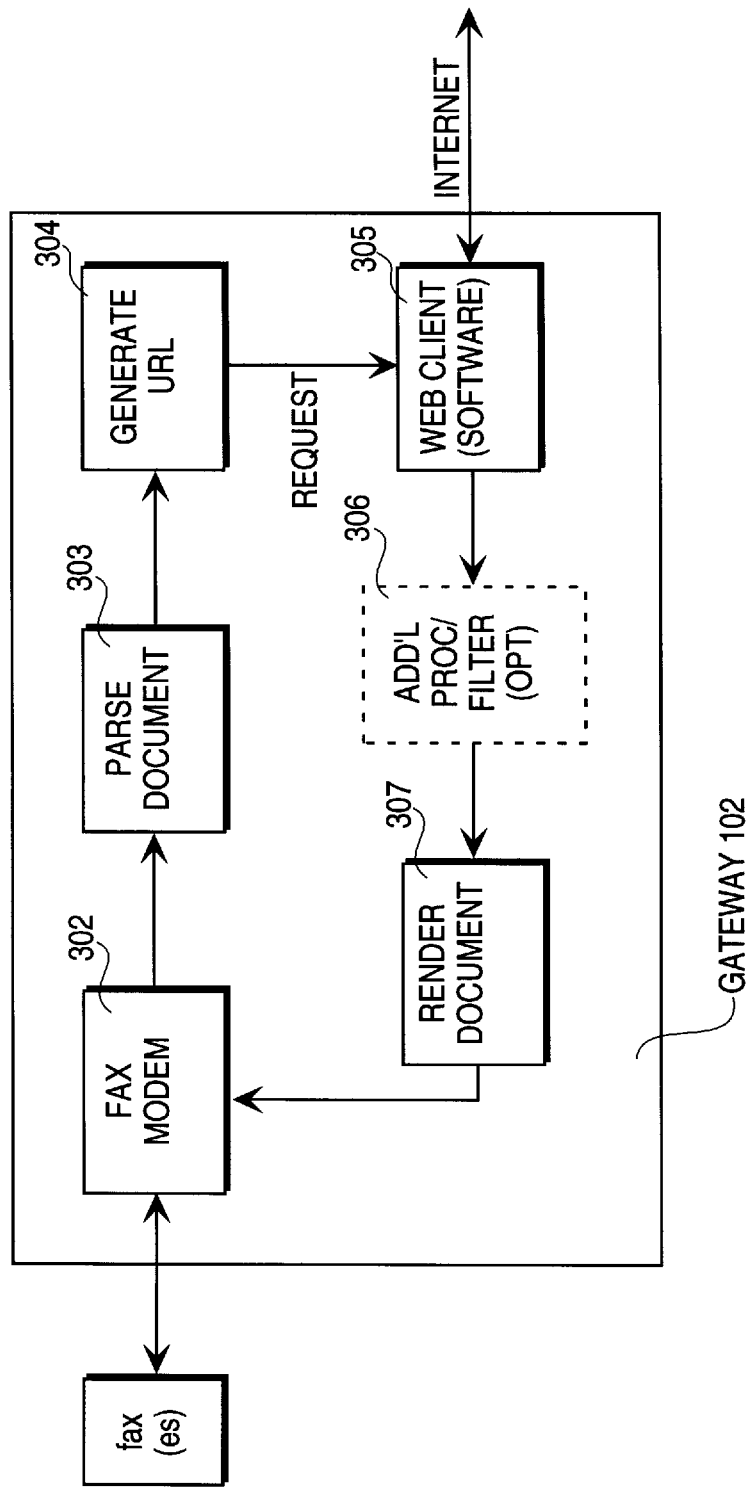

FIG. 2D illustrates one embodiment of gateway 102. Referring to FIG. 2D, facsimile (faxes) are received and sent by a fax modem 302 in gateway 102. Fax modems are well-known in the art. The received faxes are parsed by a parsing unit 303 which extracts the search terms. Using the extracted search terms, URL generator 304 generates URLs and forwards the URLs as requests to web client 305. Web client 305 forwards the requests to servers via the Internet.

Web client 305 receives document data returned through the Internet. The document data may comprise pointers to documents that satisfy the search query. Optionally, gateway 102 may include additional processing and filtering unit 306, which operates on the document data received by web client 305, as described above. Such processing may combine search results from the responses of multiple servers. The processing may also include a scoring system by which gateway 102 determines how closely the results match the search query, and additional processing logic by which those search results that do not match as well may be discarded. The resulting document data (from web client 305 or from additional processing/filtering 306) is rendered by document rendering unit 307. Rendered documents are forwarded to fax modem 302, which faxes documents to one or more fax machines.

Any of the units in FIG. 2D may be implemented in hardware, software, or a combination of both. In one embodiment, each of the parsing unit 303, the URL generator 304, web client 305, additional processing and filtering unit 306, and document rendering unit 307 may be implemented in software that runs in gateway 102. Note that hardware within gateway 102 supporting each of the components is well-known in the art, including buffer memories, communication receiving and transmitting hardware, etc.

Document Retrieval

Figure 4:
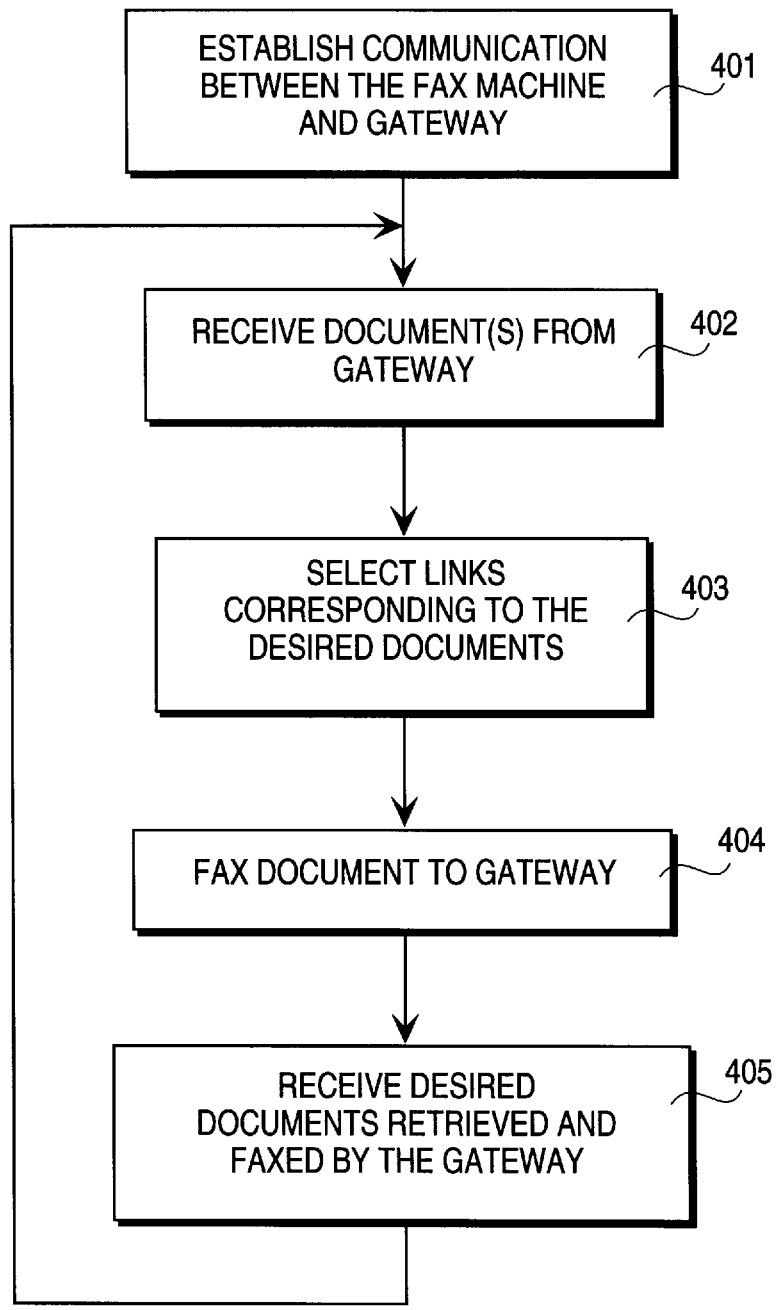
FIG. 4 is a flow diagram of one embodiment of the document retrieval process performed by a facsimile machine user in the present invention.

FIG. 4 is a flow diagram illustrating the process of document retrieval performed by the user of fax machine 101 according to the present invention. Referring to FIG. 4, the user begins the process by initiating communication between fax machine 101 and gateway 102 (processing block 401), in the same manner as described above, with the search results document(s) being sent to the user (processing block 402).

The search results document(s) received from gateway 102 contains links to the documents that satisfy the search criteria and may be retrieved for the user. In one embodiment, the links are hypertext links. The links are encoded and formatted into machine readable information on the document. The machine readable information may be in a digital format, such as a bar code or digital paper, one embodiment of which is described in U.S. Pat. No. 5,337,362, entitled "Method and Apparatus for Placing Data Onto Plain Paper", issued on Aug. 9, 1994, and assigned to the corporate assignee of the present invention. Other types of encoding may be used in the present invention as long as identification and selection of links are possible.

In one embodiment, the search results document received from gateway 102 contains machine readable information that indicates the hypertext links or "hot spots" that can be circled to retrieve further documents. In one embodiment, the machine readable information is placed beneath an image or piece of text. In this manner, the user is made clearly aware of what links are active. The machine readable information may indicate the Universal Resource Locator (URL) of the linked documents to be retrieved. The URL identifies and locates the document on the World Wide Web, and is well-known in the art. An exemplary document showing text with bar codes representing links beneath the text in the document is shown in FIG. 5. In an alternative embodiment, icons could be used to represent links. Many icons may fit on a single page, and the icons themselves could include machine readable URL information.

The user selects one or more links on the document, indicating those documents that are desired (processing block 403). In one embodiment, the user selects a link on the document by circling the link. Any manner of encircling a link or marking a link as a means of selecting that link may be used in the present invention. For instance, a square or other shape may be drawn around a link to select it.

In an alternative embodiment, the document may include a special input location (e.g., a box) into which the user writes the desired links or documents or some other information to identify the desired documents. For instance, the document may include a form with entry boxes for the user to write selections. Note that in such a case, gateway 102 may perform some type of character recognition to determine the selections.

In one embodiment, a link may be selected by inputting numbers associated with each link on a keypad, such as the keypad of fax machine 101.

Referring to FIG. 5, one of the links is selected by the user by circling the bar code corresponding to the link. Note that the text or graphics accompanying the link does not have to be circled or otherwise selected. A user may select any number of links on the document. In other words, the user may circle any number of bar codes contained in the document.

Selection may include together highlighting a portion of an image (e.g., circling a link) and also placing a mark on a particular location of the image. Based on both the highlighting and the location of the mark, one or more documents may be retrieved.

After selection, the user feeds the document into fax machine 101 and faxes the document to gateway 102 (processing block 404), which, in turn, retrieves the document from any where in the world via the World Wide Web 103, or any electronically accessible source, and faxes rendered versions of requested documents back to fax machine 101 or any electronically accessible source.

Fax machine 101 produces hard copies of the retrieved documents faxed by gateway 102 (processing block 405). The user can retrieve further information by selecting (e.g., circling) links on the new newly received documents and then repeating processing blocks 404 and 405.

Gateway 102 receives and processes facsimile transmissions received from fax machine 101 that contain a document retrieval request. Gateway 102 fulfills the requests by retrieving documents corresponding to the links selected on the document. The process of the processing logic of gateway 102 to receive and fulfill the document retrieval request from the search results is illustrated by the flow diagram in FIG. 6.

Figure 6:
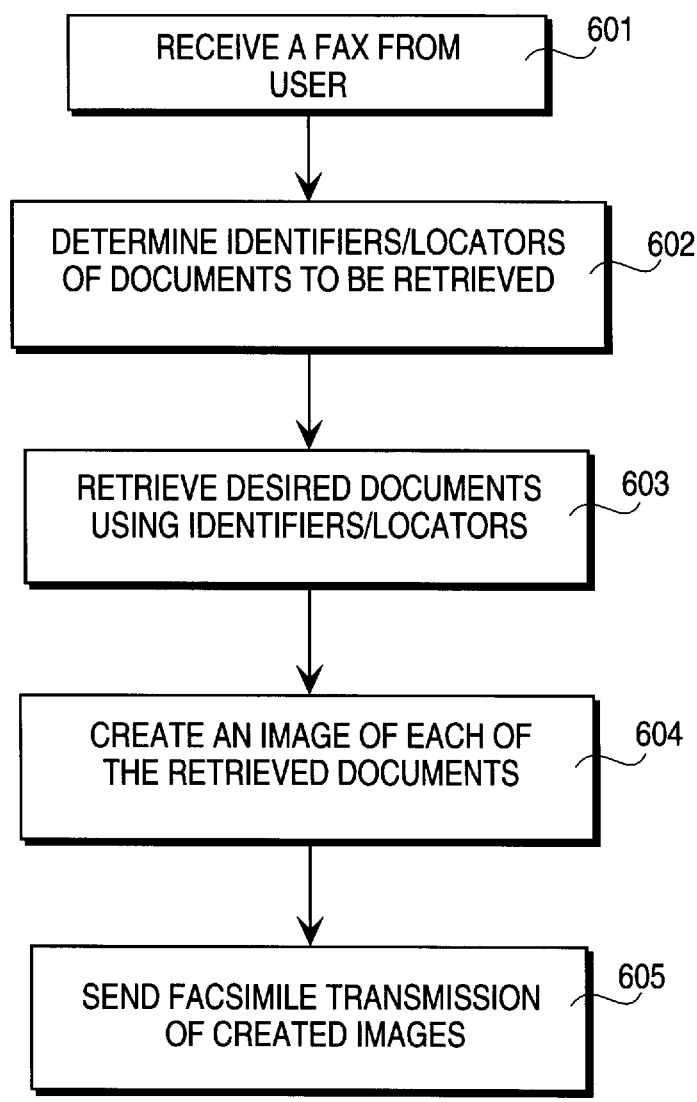
FIG. 6 is a flow diagram of one embodiment of the document retrieval process performed by the gateway of the present invention.

The processing logic of gateway 102 begins when the user faxes a document with circled links (e.g., hypertexts, etc.) to gateway 102. Referring to FIG. 6, gateway 102 initially receives the facsimile image, e.g. via a fax modem (processing block 601), such as, for instance, the image of the document shown in FIG. 5.

Upon receipt of the fax, gateway 102 determines the locator/identifier (e.g., the URL) of the document(s) to be retrieved from the faxed image (processing block 602). Gateway 102 performs the determination by extracting the machine readable information selected by the user. In one embodiment, gateway 102 extracts the selected links using recognition and digital decoding techniques that are well-known in the art. One embodiment of the extraction process performed by gateway 102 is described below in conjunction with FIG. 7.

In one embodiment, a "barcode" or "one-dimensional digital paper" is used that is insensitive to resolution differences between different bitmap representations of the image. The "bar codes" comprises alternating black and white spaces. The information is contained in the relative length of the runs of the black. Each code begins with a special marker of a black space followed by a white space followed by another black space, where the length of the white space is approximately equal to the length of each of the surrounding black spaces. Subsequent runs of black are compared with the average length of the runs in the start sequence and are interpreted as multiples of that length. An ending sequence similar to the start sequence is required for a valid code. Any long run of white before the end sequence will invalidate the code. Since the machine readable code is based on the relative lengths of the runs, it is insensitive to the resolution and can be computed quickly in a single pass through the image. Thicker codes (e.g., the height) add redundancy, making it insensitive to skew and noise.

Where the document comprises, for instance, a form, gateway 102 may be required to perform recognition on specific areas or boxes on the image to identify the documents to be retrieved. Gateway 102 may also have to locate marks (e.g., "x", etc.) placed on the document by the user that are part of the document selection process.

Using the locator/identifier, gateway 102 retrieves the desired documents over the Internet 105 (processing block 603). Note that gateway 102 may also have to use marks (e.g., "x") on the image along with the locator/identifier to retrieve a document. In such a case, a different document is sent if the mark is made in a different location, even though the locator/identifier is the same. This adds a key value pair to the URL which the gateway requests from a web server that includes the x,y position of the mark in image.

Once the desired documents have been obtained, gateway 102 creates an image of each document for transmission to the user (processing block 404). In one embodiment, gateway 102 creates images by parsing, formatting and rendering the documents. The parsing of the documents, as well as formatting and rendering of the parsed documents, includes the conversion of document identifiers/locators associated with the retrieved documents to a machine readable code (e.g., bar code, digital paper, etc.) to be included in the images faxed to the user (to enable user selection of additional documents). Rendering is necessary for most documents to convert the data from ASCII to a raster bitmap, the protocol used by fax machines (and other marking engines).

Once the image has been created, gateway 102 sends the image by fax to the user (processing block 605). Upon receipt of the retrieved documents from gateway 102, the user may select additional documents for retrieval as described above. In this manner, a fax machine may retrieve any document on the Web without having an Internet connection available to itself.

Gateway 102 may return not only a requested page, but also all or some number of pages pointed to by that page. On the other hand, gateway 102 may split up pages that are very long and only return part of the page, along with a link to the remainder.

Figure 7:
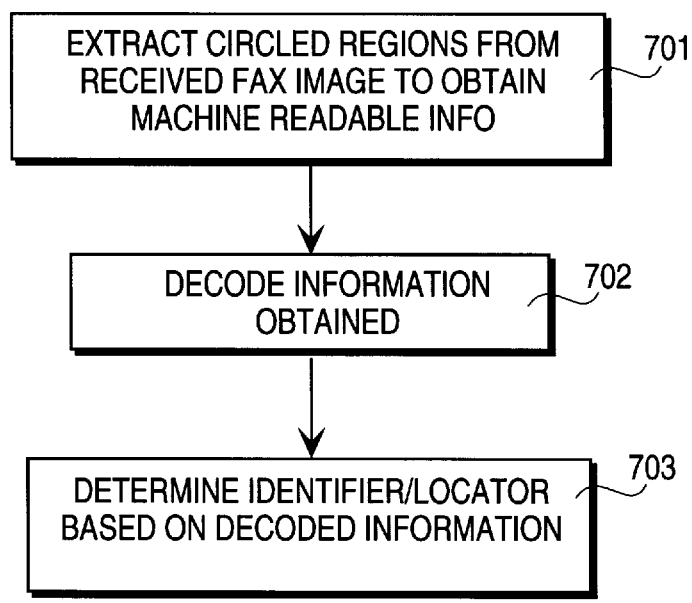
FIG. 7 is a flow diagram of one embodiment of the process for extracting selected machine readable information from a received document according to the present invention.
Figure 8:
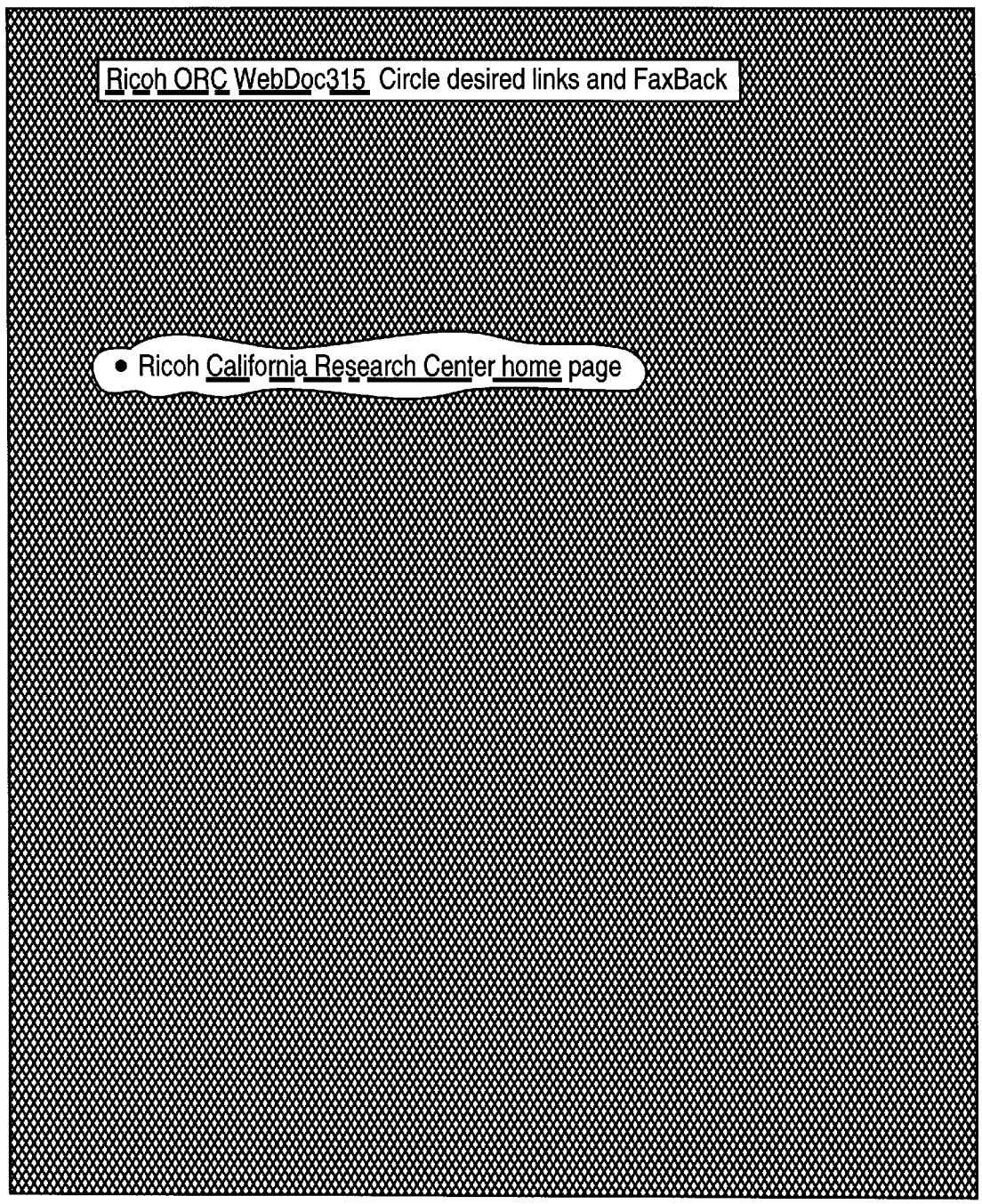
FIG. 8 illustrates an example of a painted image that results from applying one embodiment of the extraction process of the present invention.

FIG. 7 illustrates one embodiment of the extraction process performed by gateway 102 of the present invention. Referring to FIG. 7, gateway 102 initially extracts circled regions from the faxed image received via its fax modem(s) (processing block 701). In one embodiment, the circled regions are extracted by painting the entire image a single color (e.g., black) except for the circled regions. Thus, only the machine readable information (e.g., bar codes) that is circled remain after painting the image. An example of a painted image is shown in FIG. 8.

Then the processing logic of gateway 102 searches the document for circled regions (non-painted regions) based on the pixel color until the circled regions are obtained. Once located, the information in the circled regions is extracted.

After extracting the circled regions, the information is decoded to determine the identifier/locator, URL, (processing block 702). Thus, the bar codes or other machine readable code circled on the received faxed image are decoded to produce a code.

Using the code, gateway 102 obtains the identifier/locator (e.g., URL) (processing block 703). In one embodiment, the code comprises the identifier/locator (e.g., the URL). In an alternative embodiment, the code resulting from the decoding performed by gateway 102 is used by gateway 102 as a pointer to an accessible storage location, list or table that contains the identifier/locator. As a pointer, the code may include a first portion representing a pointer to the list or table and a second portion indicating the entry in the list or table that contains the identifier/locator. Note that in one embodiment, all of the identifiers/locators may be appear on the face of the faxed image, with the code indicating which of the listed identifiers/locators the user has selected.

One Embodiment of the Gateway of the Present Invention

Figure 9:
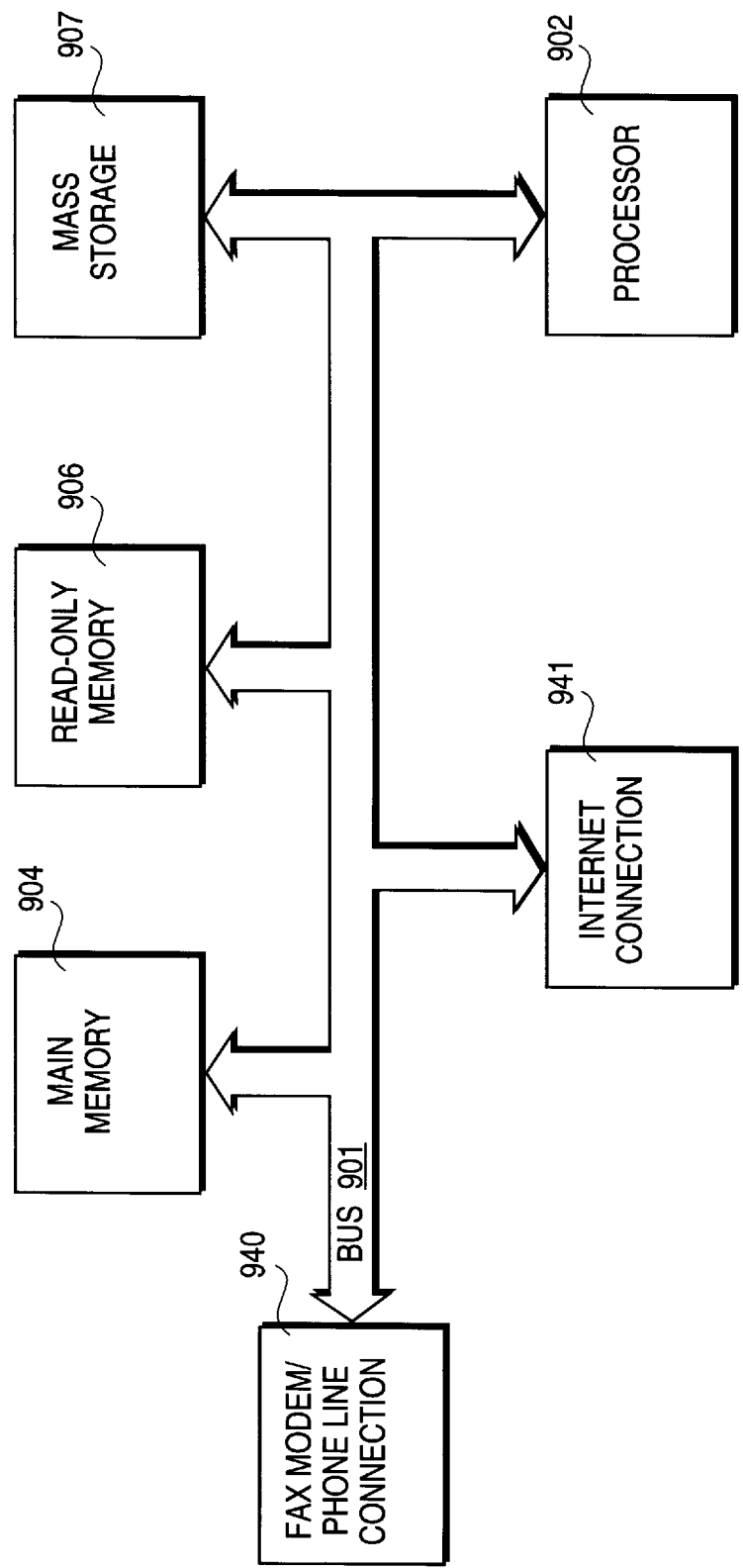
FIG. 9 is a block diagram of one embodiment of a computer system of the present invention.

One embodiment of the gateway of the present invention comprises a computer system or workstation having at least a processor, random access memory, and a bus, and runs an operating system, etc. FIG. 9 is a block diagram of one embodiment of the computer system that may incorporate the teachings of the present invention. Referring to FIG. 9, computer system 900 comprises a bus or other communication means 901 for communicating information, and a processor 902 coupled with bus 901 for processing information.

System 900 further comprises a random access memory (RAM) or other dynamic storage device 904 (referred to as main memory), coupled to bus 901 for storing information and instructions to be executed by processor 902. Main memory 904 also may be used for storing temporary variables or other intermediate information during execution of instructions by processor 902. Computer system 900 also comprises a read only memory (ROM) and/or other static storage device 906 coupled to bus 901 for storing static information and instructions for processor 902, and a data storage device 907 such as a magnetic disk or optical disk and its corresponding disk drive. Data storage device 907 is coupled to bus 901 for storing information and instructions.

Computer system 900 also comprises fax modems 940 and an Internet connection 941. Internet connection 941 may be a local area connection (e.g., ethernet) or maybe an ISDN line. In another embodiment, Internet connection 941 may be a modem running PPP or SLIP. The present invention is not limited to use with the Internet and, thus, the connection 941 may be for use in connection to any network using the TCP/IP or other protocols, to which a "router" is connected that allows communication with some other network. The two networks form an "Inter-Network". Internet refers to the largest, global set of such connected networks which may pass information back and forth between them. The methods of connecting to a network include a physical communications link, such as ethernet, ISDN, modem and phone lines, or wireless modems, and TCP/IP, SLIP, or PPP software.

Computer system 900 may further include various input/output peripherals, such as a display device, such as a cathode ray tube (CRT) or liquid crystal display (LCD) coupled to bus 901 for displaying information to a computer user. An alphanumeric input device, including alphanumeric and other keys, may also be coupled to bus 901 for communicating information and command selections to processor 902. An additional user input device is cursor control, such as a mouse, a trackball, stylus, or cursor direction keys, coupled to bus 901 for communicating direction information and command selections to processor 902, and for controlling cursor movement on a display. Another device which may be coupled to bus 901 is hard copy device which may be used for printing instructions, data, or other information on a medium such as paper, film, or similar types of media.

Note that any or all of the components of system 900 and associated hardware may be used; however, it can be appreciated that any type of configuration of the system may be used for various purposes as the user requires.

The user, or client, may need only have a fax machine that is coupled to the gateway of the present invention, permitting exchanging of documents (through phone lines).

As a gateway, computer system 900 of the present invention may run various software to perform a variety of functions. In one embodiment, computer system 900 runs Internet communications protocol software, such as, for example, TCP/IP, which is well known to those skilled in the art. Computer system 900 also runs fax modem driver software used to send and receive faxes, as well as the HyperTexts Transfer Protocol (HTTP) server software, such as, for instance, CERN or NCSA server software, which are well-known in the art. Control software is also run by computer system 900 for handling faxed images as described above. Computer system 900 may also run character recognition software, as well as bitmap extraction and processing software. Also, the computer system 900 runs software (e.g., HTTP client software) to retrieve an identifier/locator (e.g., a URL) and format it appropriately for a fax machine.

In one embodiment, to determine where to return retrieved documents, software running in computer system 900 obtains the return phone number. The phone number may also be obtained during the handshaking that occurs as part of the standard interface to fax machine 101. Once the phone number is obtained from the handshake, the software incorporates it into the Tiff image. In an alternative embodiment, fax machines remain in communication (connected) with the gateway while the document is retrieved and then sent back.

In one embodiment, when processing the image, software running in computer system 900 crops the margins of the image, identifies which active regions have been circled, fills-in those areas of the image that have not been circled, locates and parses any remaining machine readable identifiers, and for each machine readable paper mark decoded, and finds the corresponding URL in a database of URLs that have been sent to the user.

Note that in one embodiment, each document is assigned a unique ID when it is rendered by the gateway. This ID is printed at the top of the document and specifies the name of a file which holds the mapping between the machine readable codes and the URLs.

After processing the image, computer system 900 passes each URL and the return phone number to retrieval and rendering software. The retrieval and rendering engine retrieves the URL, parses the document, renders it (including the digital paper), updates the data base of document identifiers, and sends the rendered document by fax to the return phone number.

The retrieval and rendering software retrieves the URL and converts each URL in the retrieved document to a global URL which includes a full specification of the location of the link.

In one embodiment, software converts the retrieved document, which is in html format, to PostScript format or directly to G3 "fax" format. The in-line images are also retrieved and converted to PostScript for inclusion in the document. Note that in this embodiment, html source is converted to "LaTEX" format. That is, the html source is converted into source for the LaTEX document formatting system. The LaTEX source includes commands to generate the digital paper marks. Software running on computer system 900 assigns link numbers to each link and includes the appropriate LaTEX commands in a LaTEX source file to print those codes in machine readable format. Note that one mark is created to identify the document and is printed as a header on each page. Software also stores a list of codes and URLs in a temporary file. The machine readable identifiers are created and the machine readable code is printed under the text. Software running on computer system 900 then generates the PostScript image using, for example, LaTEX dvips.

Latex is a macro package for Tex, a software program written by Donald Knuth at Stanford University, Palo Alto, Calif. Latex generates "dvi" (device independent) output from the LaTEX source. These can be translated to PostScript using "dvips" a software program written by Thomas Rokicki at Stanford University, Palo Alto, Calif. All these programs are well known in the art.

In sum, any document on the World Wide Web may be retrieved through the gateway of the present invention. All the user needs is a phone number of the gateway of the present invention. A gateway may service a regional area or be a proxy machine for all the facsimile machines known to it.

Furthermore, each page may include some additional machine readable information. In one embodiment, one mark per page identifies that page, and a bit of machine readable information is printed under each active link. Thus, URL referencing can be done in a robust, page independent manner.

Finally, a modified version of the gateway could be a fax enhancement or replacement machine that individuals could use directly. This machine would be able to interface to the Internet protocol directly and would dial up an Internet access point when asked to retrieve a Web document. In this case, one benefit would be greatly simplified access to the World Wide Web (and) using basic functionality of the fax machine. Note that in addition to the Web access, such a machine could provide email access.

Whereas, many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the various embodiments are not intended to limit the scope of the claims which themselves recite only those features regarded as essential to the invention.

Thus, a document searching system has been described.

We claim:

1. A method for obtaining documents comprising the steps of:

establishing communication between a facsimile machine and a gateway;

the gateway receiving a facsimile transmission of a first document with a search term;

the gateway creating a search query based on the search term;

the gateway contacting servers on a computer network coupled to the gateway and requesting documents corresponding to the search query so as to perform a search based on the search term; and the gateway sending a second document containing search results to the facsimile machine.

2. The method defined in claim 1 further comprising the step of sending the second document containing search results via facsimile transmission.

3. The method defined in claim 2 wherein the step of sending search results comprises sending at least one document.

4. The method defined in claim 2 wherein the step of sending search results comprises sending a list of one or more resources corresponding to the search term.

5. The method defined in claim 2 further comprising the steps of:

receiving the second document having one or more of the set of resources highlighted;

the gateway identifying highlighted resources on the second document;

the gateway obtaining the highlighted resources by contacting the servers via the computer network and requesting documents corresponding to the highlighted resources; and sending the highlighted resources via facsimile transmission.

6. The method defined in claim 2 further comprising the step of filtering the search results based on a metric.

7. The method defined in claim 6 wherein the step of filtering results comprises removing duplicates from the search results.

8. The method defined in claim 1 further comprising the steps of:

identifying locations of search terms on the first document;

detecting writing at the locations identified as containing the search terms;

performing recognition on the search terms; and creating the search query based on recognized search terms.

9. The method defined in claim 8 wherein the step of identifying locations comprises locating barcodes on the first document.

10. The method defined in claim 8 wherein the step of identifying locations of search terms comprising locating at least one box on the first document containing one or more search terms.

11. The method defined in claim 6 wherein the step of performing recognition comprises the step of providing a bitmap of a search location to a recognition engine.

12. The method defined in claim 9 wherein the step of performing recognition comprises the step of performing handwriting recognition.

13. The method defined in claim 1 further comprising the step of modifying the search query using fuzzy matching.

14. The method defined in claim 1 further comprising the step of generating a uniform resource locator (URL) and retrieving a document associated with the URL from a web server.

15. A method for obtaining documents comprising the steps of:

extracting bitmaps from search locations on a document received via facsimile transmission;

passing the bitmaps to a recognition engine from which an output is generated;

querying a first network search engine with a query based on the output;

querying a second network search engine with the query;

correlating responses from the first and second network search engines into search results; and sending the search results.

16. The method defined in claim 15 further comprising the step of obtaining one or more documents set forth in a highlighted version of the search results sent via facsimile.

17. A system for searching for documents on a network comprising:

a facsimile machine;

a gateway coupled to the facsimile machine and the network, said gateway comprising a modem to receive a facsimile transmission of a first document;

a recognition engine coupled to the modem to receive bitmaps as inputs, wherein an output of recognition engine comprises at least one search term from the facsimile transmission of the first document;

a search engine coupled to receive said at least one search term from the recognition engine, the search engine creating a search query based on the search term, contacting servers on the network and requesting documents corresponding to the search query so as to perform a search based on the search term, wherein the search engine has an output of search results based on said at least one search term; and a rendering unit to send a second document containing the search results to the facsimile machine.

18. The system defined in claim 17 wherein the second document includes a list of documents.

19. The system defined in claim 17 further comprising a document retrieval unit coupled to receive the second document, wherein an output of the document retrieval unit comprises one or more documents selected in the second document.

20. The system defined in claim 19 wherein the document retrieval unit is coupled to the facsimile machine and further wherein the second document comprising search results is received by the document retrieval unit from the facsimile machine.

21. The system defined in claim 20 wherein the document retrieval unit is coupled to the facsimile machine, and further wherein an input of the facsimile machine comprises the one or more documents from the document retrieval unit, said facsimile machine sending the one or more documents.

22. The system defined in claim 17 wherein the recognition engine comprises a handwriting recognition engine.

23. The system defined in claim 17 wherein the search engine comprises an http search engine.

24. The system defined in claim 17 wherein the gateway further comprises a writing detector coupled to receive an electronic version of a search form from the facsimile machine, wherein an output of the detector comprises bitmaps of search terms in the electronic version of the search form.

25. The system defined in claim 24 wherein the detector identifies locations of search terms on the electronic version of the search form and detects writing at identified locations.

26. The system defined in claim 25 wherein the detector outputs bitmaps of the identified locations at which writing is detected.

27. The system defined in claim 25 wherein the detector identifies locations by locating barcodes on the electronic version of the search form.

28. An apparatus for obtaining documents:

means for establishing communication between a facsimile machine and a gateway;

means for receiving a facsimile transmission of a first document with a search term;

means for creating a search query based on the search term;

means for contacting servers on a computer network coupled to the gateway and requesting documents corresponding to the search query so as to perform a search based on the search term;

means for sending a second document containing search results to the facsimile machine via facsimile transmission:

means for receiving the second document having one or more of the set of resources highlighted;

means for identifying highlighted resources on the second document;

means for obtaining the highlighted resources by contacting the servers via the computer network and requesting documents corresponding to the highlighted resources; and means for sending the highlighted resources via facsimile transmission.

29. The apparatus defined in claim 28 further comprising means for sending a list of one or more resources corresponding to the search term.

30. The apparatus defined in claim 28 further comprising:
   means for identifying locations of search terms on the first document;
   means for detecting writing at the locations identified as containing the search terms;
   means for performing recognition on the search terms; and
   means for creating the search query based on recognized search terms.

31. A method for accessing information comprising the steps of:
   receiving a facsimile transmission of a first document with a search term;
   performing a search based on the search term;
   sending a second document with search results;
   receiving an image of the second document from a first location with a document identifier;
   extracting the document identifier from the image;
   retrieving a third document corresponding to the document identifier;
   dynamically generating an image of the third document, including the step of encoding links to other documents in the third document into machine readable codes; and
   sending the image of the third document to the first location.

32. The method defined in claim 31 further comprising the step of locating in the image of the second document the machine readable codes near locations of links to other documents that are in the second document.

33. The method defined in claim 31 wherein the image of the third document is sent by facsimile transmission.

34. A method for processing information comprising the steps of:
   receiving a facsimile transmission of a first document with a search term;
   performing a search based on the search term;
   sending a second document with search results;
   receiving a facsimile of the second document from a location;
   extracting a resource identifier from the facsimile of the second document;
   retrieving a third document corresponding to the resource identifier;
   generating an image of the third document including rendering links to other documents into machine readable information near link points in the image; and
   sending by facsimile the image of the third document to the location.

35. The method defined in claim 34 further comprising the step of parsing the third document to create the image.

36. The method defined in claim 34 wherein the resource identifier comprises a universal resource locator (URL).

37. The method defined in claim 34 wherein the third document is retrieved from a network.

38. The method defined in claim 34 wherein the step of extracting the resource identifier comprises extracting selected encoded information in the facsimile of the second document and decoding the information to obtain the resource identifier.

39. The method defined in claim 38 wherein the encoded information comprises bar codes.

40. The method defined in claim 38 wherein the encoded information comprises digital paper.

41. The method defined in claim 38 wherein the encoded information comprises run length encoded information.

42. The method defined in claim 34 wherein the step of extracting a resource identifier comprises the steps of:
   filling regions, of the facsimile of the second document, other than those encircled;
   decoding encoded information in the encircled regions to obtain at least one code; and
   identifying at least one resource identifier using said at least one code.

43. The method defined in claim 42 wherein the step of identifying comprises accessing a stored listing using said at least one code as a pointer to said at least one resource identifier.

44. The method defined in claim 34 further comprising the step of rendering the second document.

45. The method defined in claim 44 wherein the second document is rendered as a bitmap.

46. A computer software product including a medium readable by a processor, the medium having stored thereon a sequence of instructions which, when executed by a processor, causes the processor to:
   receive a facsimile transmission of a first document with a search term;
   perform a search based on the search term;
   send a second document with search results;
   receive an image of the second document from a first location with a document identifier;
   extract the document identifier from the image;
   retrieve a third document corresponding to the document identifier;
   dynamically generate an image of the third document, including the step of encoding links to other documents in the third document into machine readable codes; and
   send the image of the third document to the first location.

47. A method for viewing a document comprising the steps of:
   performing a search from a search query created using a search term obtained from a facsimile;
   sending an image on a paper containing search results obtained from performing the search;
   highlighting encoded information in the image on the paper to select at least one document for retrieval, wherein the encoded information represents links to other documents;
   sending by facsimile a copy of the paper with the highlighted encoded information to a server designed to retrieve said at least one document based on a decoded version of the highlighted encoded information; and
   creating an image of said at least one desired document including the step of dynamically generating encoded link information and including the encoded link information in the image, wherein the link information specifies at least one other document linked to said at least one document;
   receiving by facsimile said at least one desired document retrieved by the server.

48. The method defined in claim 47 wherein the step of highlighting comprises the step of marking the paper so as to substantially surround encoded information on the paper.

49. The method defined in claim 47 wherein the encoded information comprises bar codes.

50. The method defined in claim 47 wherein the step of highlighting comprises the step of circling encoded information on the paper.

51. The method defined in claim 47 wherein the step of highlighting comprises the step of placing a mark on the paper to select encoded information representing at least one hypertext link.

52. The method defined in claim 47 wherein the encoded information indicates at least one URL of a linked document, and wherein the user highlights one or more of said at least one URL to view the linked document associated with highlighted URLs.

53. The method defined in claim 47 further comprising the step of obtaining the image by sending a facsimile of an image to the server.

54. The method defined in claim 53 wherein the image is a blank page.

55. An apparatus for retrieving documents from a source having a group of resources in response to a document request, said apparatus comprising:
   means for receiving a facsimile of a first document containing a search term;
   means for performing a document search using the search term;
   means for generating a second document containing search results;
   means for processing the second document to obtain an identifier;
   means for retrieving a third document corresponding to the identifier;
   means for rendering the third document after retrieval, including means for encoding link information associated with other documents into machine readable information so that links to other documents are encoded in the third document; and
   means for sending a facsimile image of the third document after retrieval and rendering.

56. A computer software product including a machine readable by a processor, the medium having stored thereon a sequence of instructions which, when executed by a processor, causes the processor to:
   receive a facsimile transmission of a first document with a search term;
   perform a search based on the search term;
   obtain an electronic version of a second document containing link information;
   identify a link for each document accessible via the link in the electronic version of the second document;
   generate machine readable information for each link of said each document that may be retrieved upon selection of the link; and
   render a third document with the machine readable information.

57. The computer software product defined in claim 56 wherein the second document comprises a html document.

58. The computer software product defined in claim 56 wherein the first document comprises a form having input locations for user-entered information.

59. The computer software product defined in claim 58 wherein the input locations comprise boxes.

* * * * *